(No Model.)

W. H. HILL.
GRINDING MECHANISM.

No. 527,748. Patented Oct. 16, 1894.

Witnesses:
Sidney P. Hollingsworth
R. Washington Miller

Inventor:
William H. Hill
by his attorneys,
Baldwin Davidson & Wight

UNITED STATES PATENT OFFICE.

WILLIAM H. HILL, OF DENVER, COLORADO, ASSIGNOR OF ONE-HALF TO JOSHUA PICCIOLI, OF SAME PLACE.

GRINDING MECHANISM.

SPECIFICATION forming part of Letters Patent No. 527,748, dated October 16, 1894.

Application filed June 22, 1894. Serial No. 515,414. (No model.)

*To all whom it may concern:*

Be it known that I, WILLIAM H. HILL, a citizen of the United States, residing at Denver, in the county of Arapahoe and State of Colorado, have invented certain new and useful Improvements in Grinding Mechanism, of which the following is a specification.

The object of my invention is to provide mechanism for grinding packing rings, and especially packing rings employed in the joints connecting the steam pipes of locomotives with the boiler. It is customary to connect the steam cylinders of the locomotive with the boiler by pipes which at the boiler end have couplings provided with rings having on one side a plain, flat surface, and on the opposite side a beveled or tapered surface. It is of importance that the joints should be smooth and tight and to effect this it is necessary to grind and re-grind constantly the beveled surface of the ring, and the corresponding surface of the coupling. I have provided mechanism by which not only can the ring and the adjacent surface of the coupling be ground expeditiously, but it can be done thoroughly and uniformly.

My improvements are illustrated in the accompanying drawings, in which—

Figure 1:
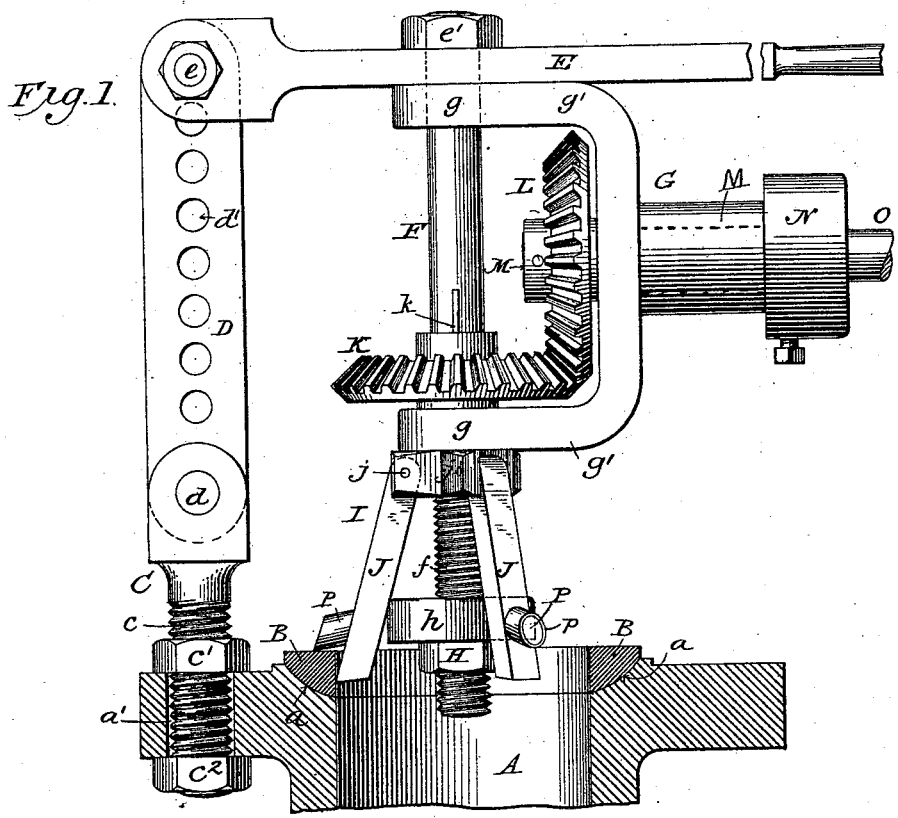
Figure 2:
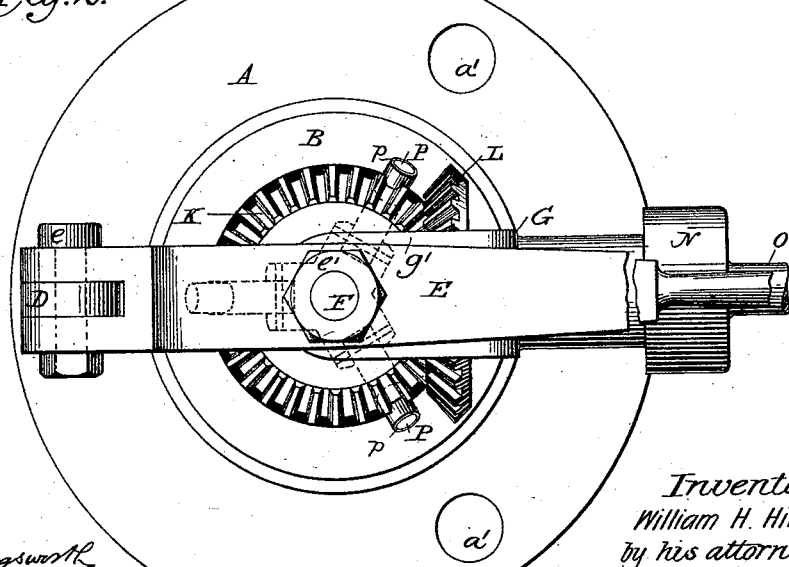

Figure 1 shows my improved grinding apparatus applied to the coupling of the steam pipe of a locomotive which connects the boiler with the cylinder. Fig. 2 is a plan view of the mechanism shown in Fig. 1.

The coupling section A, of the steam pipe is provided with a recessed, beveled or concaved seat $a$, for the packing ring B, and with bolt holes $a'$, as usual. I utilize one of the bolt holes $a'$ to attach the bracket of the grinding mechanism to the coupling. One section of the bracket is screw-threaded at $c$, and nuts $c'$ $c^2$, secure it firmly to the flange of the coupling. At its opposite end the section C, of the bracket is pivotally connected at $d$, with the other bracket section D, which is provided with a series of perforations $d'$, to receive a pivot pin $e$, which attaches a hand lever, or handle, E, to the bracket. The pivot pin is detachable and the hand lever may be attached to the bracket at any desired point. A shaft F, parallel with the supporting bracket extends loosely through the handle E, and through bearings $g$, in the arms $g'$ of the frame G. A nut $e'$, confines the hand lever E, in a position close to the outer arm of the frame G. The lower end of the shaft F, is screw-threaded at $f$, and carries a nut H, provided with an enlarged head $h$. It also carries a support I, having a series of arms J, which are pivotally connected at $j$, between lugs projecting from the support. A bevel pinion K, is secured to the shaft F, inside the arms $g'$, of the frame G, and gears with a bevel pinion L, mounted on a shaft M, secured to a driving shaft O, by a coupling N.

The driving shaft may be driven by a crank or by power applied in any suitable way. The arms J, (three being preferably employed,) extend from the support I, toward the extremity of the screw-threaded shaft F, and each carries a lug P, the center of which may be formed of hard metal, while the exterior is provided with a coating or sheathing $p$ of soft metal, such as copper. The head $h$, of the nut H, is arranged to bear against the inner surfaces of the arms J, and by the operation of the nut the arms may be expanded. When the nut is moved toward the outer end of the shaft, the arms may be compressed or moved inwardly toward each other, but when the nut is turned so as to move it toward the support I, the arms will be expanded. By this arrangement, the arms which constitute a chuck or holder may be made to fit a packing ring B, of any diameter. The extreme outer ends of the arms are arranged to engage with the inner side of the ring B, while the lugs P rest on the outer, flat surface.

In the class of couplings in which a packing ring B, such as illustrated, is employed, there is no joint at the inner surface of the ring, and consequently any scratching or indentations which may result from applying the arms to the ring is not material. A tight joint is, however, necessary between the convexed or tapered side of the ring and the seat $a$ in the coupling. It is also desirable that the outer, flat surface of the ring should be kept smooth, and by employing soft metal coating or sheathing on the lugs P, injury is prevented. The lugs form guides or stops to enable the operator to insert the arms to a proper extent in the ring, so that they will engage at the proper points therein to most efficiently secure them thereto. When thus secured, power may be applied to the shaft M, and a rotary motion given to the shaft F, which causes the ring B, to rotate rapidly and grind the joint. In order to examine the work as it progresses, it is only necessary to operate the handle E, to turn the bracket section D about its pivot $d$, and the grinding mechanism carrying the ring B, will be removed bodily from the coupling A, and the adjacent surfaces of the coupling and the ring may be inspected. The ring and the grinding mechanism may in like manner be quickly replaced to the proper position, and the operation of grinding resumed. To detach the chuck from the ring, it is only necessary to turn the nut H, to permit the arms to contract. The apparatus may be quickly removed from the coupling, by detaching the nut $c^2$.

It is important that the shaft F, should be approximately in line with the axis of the ring, and to this end, the pivot $e$, is made adjustable on the bracket section D, in order that different positions of the holder I, on the screw-threaded shaft may be compensated. When the arms J, are expanded to a greater extent than that shown in Fig. 1, it necessary to change the pivot $e$, to another perforation in the bracket section D. Of course, other devices may be employed for adjusting the handle E, on the bracket section. The arrangement is such that the handle E, and the frame G, may thus be made to follow the movement of the holder I, and all parts of the mechanism be made to maintain the proper relative positions. The pinion K, is secured to the shaft F by a key $k$.

While I have described simple and efficient mechanism for carrying out my invention, I do not limit myself to the details of construction shown and described. Other forms of chucks or ring-holding devices may be employed, and the driving mechanism may be applied in different ways.

I claim as my invention—

1. The combination of a screw-threaded shaft, a series of expansible and contractible arms, a support I to which they are pivotally connected and which is secured to the screw-threaded shaft, a nut arranged on the shaft and adapted to expand the arms, mechanism for rotating the shaft, a bracket composed of stationary and pivoted sections, a handle pivotally connecting the bracket with the screw-threaded shaft, and adjustable connections between the handle and the pivoted section of the bracket.

2. The combination of a rotatable screw-threaded shaft, a series of expansible and contractible arms having laterally projecting lugs near their ends, means for rotating the shaft and a nut for expanding the arms.

3. The combination of a supporting bracket, a handle attached thereto, a screw-threaded shaft, a series of expansible and contractible arms, a support or head to which they are pivotally connected, a frame interposed between said support and the handle, a nut on the screw-threaded end of the shaft for expanding the arms and gearing for driving the shaft.

4. The combination of a bracket having a stationary screw-threaded member, and a pivoted, perforated member, a handle attached to the perforated member of the bracket, a screw-threaded shaft attached to the handle, a series of expansible and contractible arms connected with the shaft, a nut for expanding the arms, a frame interposed between the handle and the inner ends of the arms, and gearing for driving the shaft.

In testimony whereof I have hereunto subscribed my name.

WILLIAM H. HILL.

Witnesses:
J. A. JOHNSTON,
B. W. MILLER.